United States Patent [19]
Bergstrand

[11] 3,949,598
[45] Apr. 13, 1976

[54] METHOD AND MEANS FOR INDICATING A LEAKAGE THROUGH THE WALL OF A VESSEL
[76] Inventor: Gunnar Magnus Bergstrand, Stangholmsbacken 56, S-127 40 Skarholmen, Sweden
[22] Filed: Oct. 7, 1974
[21] Appl. No.: 512,890

[30] Foreign Application Priority Data
Oct. 10, 1973  Sweden .............................. 7313782

[52] U.S. Cl. .................................. 73/49.2; 73/40.7
[51] Int. Cl.² ......................................... G01M 3/04
[58] Field of Search .............. 73/40, 45.4, 46, 49.2, 73/49.3, 52, 40.7

[56] References Cited
UNITED STATES PATENTS
2,927,456   3/1960   Russell .................................. 73/46
3,813,923   6/1974   Pendleton ........................... 73/49.2

Primary Examiner—Richard C. Queisser
Assistant Examiner—John S. Appleman
Attorney, Agent, or Firm—Wenderoth, Lind & Ponack

[57] ABSTRACT

Leakage through a fraction of the wall of a vessel is indicated by delimiting, at one side of the wall fraction, a narrow closed space connected to pressure measuring means, whereupon both sides of the wall of the vessel, except the area enclosed in the narrow space, are subjected to a similar gas pressure higher than the pressure within the space.

3 Claims, 1 Drawing Figure

U.S. Patent  April 13, 1976  3,949,598
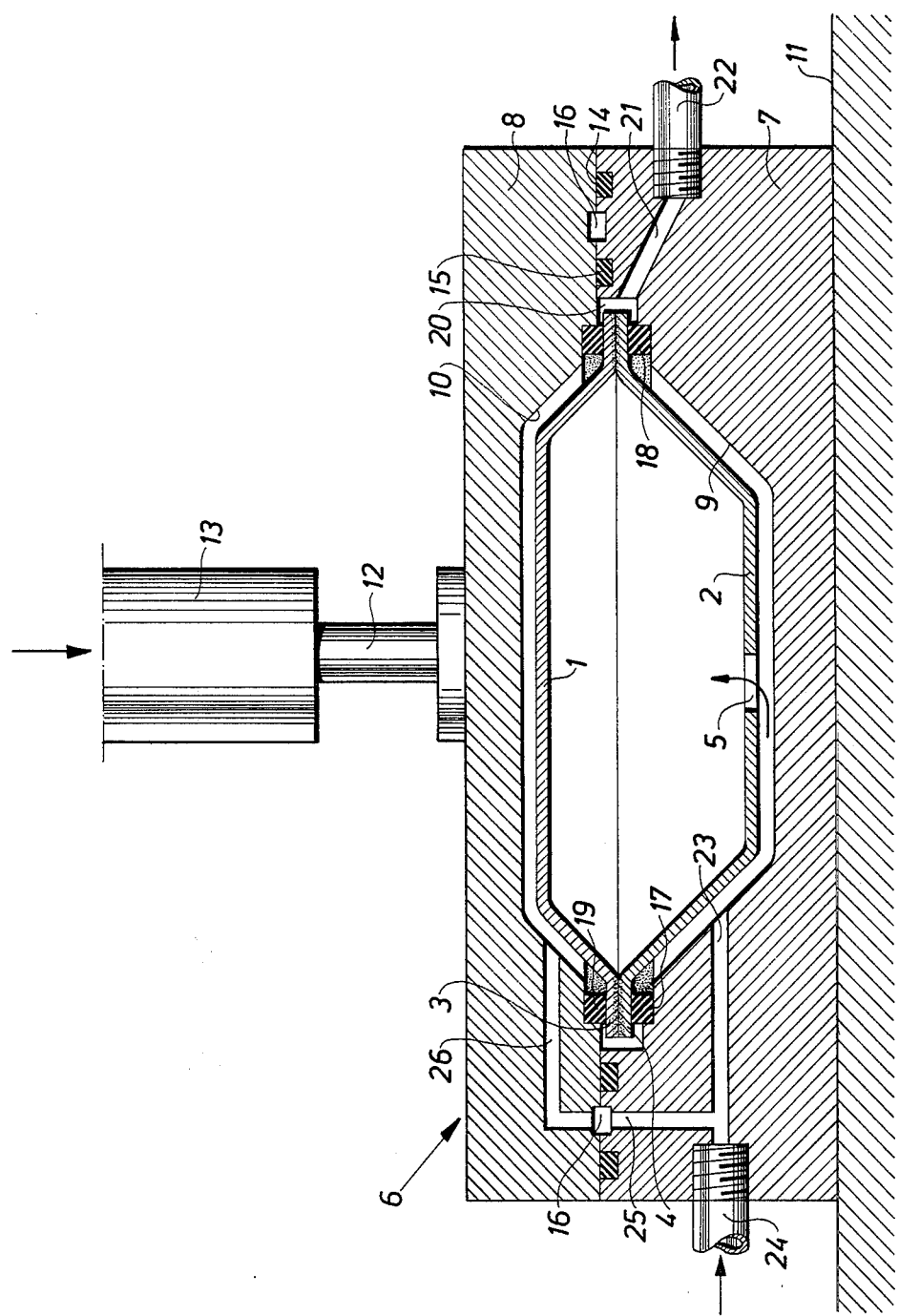

METHOD AND MEANS FOR INDICATING A LEAKAGE THROUGH THE WALL OF A VESSEL

BACKGROUND OF THE INVENTION

The invention relates to improvements in a method and means for indicating leakage through the wall of a vessel.

To indicate leakage through a fraction of the wall of a vessel, such as a joint or seam made by soldering, gluing or welding, it is known to delimit a narrow closed space connected to a pressure measuring instrument at one side of the wall fraction to be tested, whereupon an increased gas pressure is caused to act on the opposite side of the wall of the vessel. Leakage through the wall fraction may then be seen as a reading on the measuring instrument.

However, a reliable leakage test may be made quite impossible, if the wall of the vessel is sufficiently resilient to be a little deformed by the pressure applied. In such a case it has been necessary to use lower overpressure, which involves a slower testing. On the other hand, a very quick test is highly desirable, especially in mass production of simple and cheap vessels or containers such as radiators and fuel tanks for cars. Moreover, it is desired that the test may be carried out mostly automatically without a lot of manual work.

SUMMARY OF THE INVENTION

According to the invention which implies a further development of the method mentioned above, it has been possible to reduce essentially the time required for testing for leakage through a fraction of the wall of a vessel. The new method consists in that both sides of the wall of the vessel, except the area enclosed in the narrow space which is connected to the measuring means, are subjected to exactly the same increased gas pressure which is higher than the pressure within the space. Hereby it is possible, without risk of deformation of the vessel, to increase the pressure considerably, ten times for instance, compared with the prior method in which only one side of the vessel was loaded by an increased pressure. Since, according to known physical laws, the flow through a restricted passage or leak increases in proportion to the square value of the increased pressure, the time required for the testing will in this way be reduced to a few seconds only.

As an example, it may be mentioned that in prior testing of fuel tanks the highest permissible overpressure has been thought to be about .2 atm. gauge, as otherwise there was a risk of deformation. According to the invention, a pressure of 2.0 atm. gauge or even higher may be used, whereby the speed of flow through a leak is increased 100 times or more. Owing to the rapid percolation, very small leaks may also be detected without delay, and in this way the new test will also be more reliable than the old method.

Means for carrying out the method described above may comprise a receptacle composed of two rigid dismountable parts and dimensioned to receive, with a slight clearance only, the vessel to be tested. On their insides the two receptacle parts are provided with sealing members adapted to delimit, in cooperation, a closed space around a vessel wall area to be tested, such space being connected to a pressure meter. Further, channels through the two parts of the receptacle are provided to connect a source of pressure gas to the remaining portions of the clearance between the inside of the receptacle and the outside of the vessel including the vessel opening or openings. Of course, the vessel wall area to be tested must be separated from such vessel openings.

BRIEF DESCRIPTION OF THE DRAWING

A preferred embodiment of a device adapted for leakage testing of fuel tanks for cars is shown in the accompanying drawing.

DETAILED DESCRIPTION OF A PREFERRED EMBODIMENT

In a known manner, the fuel tank shown is made of two bowls 1 and 2 having edge flanges 3 and 4, respectively, turned to each other and welded together. The lower bowl 2 has a central opening 5 intended to be turned upwards and to be connected to a filler tube, when the tank is mounted on a car. However, before such mounting it is necessary to determine whether the welded joint between the flanges 3,4 is entirely leakproof.

The receptacle 6 is composed of two blocks 7 and 8 containing cooperating cavities 9 and 10, respectively, which are dimensioned to enclose the tank bowls 1 and 2 with some clearance. The lower block 7 rests on a fixed frame 11, while the upper block 8 is secured to the lower end of a piston rod 12 protruding downwards from a working cylinder 13. Thus, the upper block 8 may be raised from and lowered into contact with the bottom block 7. The cavities 9,10 are surrounded by flat annular surfaces which cooperate to establish a good sealing. Thus, the annular surface of the bottom block 7 is provided with two concentric grooves containing sealing rings 14,15 which seal against the annular surface of the upper block 8, and between these rings 14,15 a concentric channel 16 is formed by a groove in one of the annular surfaces or possibly by two cooperating grooves in both surfaces.

Slightly inside its periphery the cavity 9 in the bottom block 7 has an annular step 17 serving as support for a sealing ring 18 which seals against the lower flange 4 of the tank bowl 2. In the same way a sealing ring 19 is fitted around the cavity 10 of the top block 8 to seal against the upper flange 3 of the tank bowl 1, when the receptacle 6 is closed. The interior of the receptacle 6 is divided into three compartments, i.e. a chamber outside the tank bowl or wall 1, a chamber outside the tank bowl or wall 2 in communication with the cavity within the tank through the opening 5, and an annular space 20 formed outside the sealing rings 18,19 and the intermediate flanges 3,4 including the weld joint which has to be tested.

A "radial" channel 21 extending from the annular space 20 through the bottom block 7 has its outer end connected to a pipe 22 which leads to a pressure measuring instrument, not shown. Another radial channel 23 through the bottom block 7 extends from the cavity 9 to a pipe conduit 24 adapted to be connected to a source of compressed gas. Further, a channel 25 connects the channel 23 to the annular channel 16, and a channel 26 extends from the channel 16 to the cavity 10 in the top block 8.

When the fuel tank has been put in position for testing, and the receptacle has been closed, as is shown in the drawing, compressed gas is supplied through the conduit 24 and further on through the channels 23, 25, 16 and 26 to the two clearances between the bottoms of the cavities 10 and 9 and the tank walls 1 and 2, respectively. From the latter clearance the gas will also pass into the tank through the opening 5, so that the tank is subjected to the same pressure internally as well as externally and thus doesn't run the risk of being deformed even at high pressures. Any leakage through the weld joint results in a reading on the measuring instrument connected to the annular channel 20.

The annular channel 16 between the sealing rings 14,15 serves to control the efficiency of the sealing ring 15 located between the channel 16 and the annular space 20. If the sealing ring 15 were not leakproof the pressure measuring instrument would always indicate a raised pressure derived from the high pressure in the channel 16, and such a permanent leakage would rather soon be observed as being abnormal.

If desired, the device described may with advantage be combined with a conveyor adapted to supply the tanks to be tested, and the whole equipment may then be designed to operate nearly automatically.

When in the foregoing description the word "annular" has been used in connection with sealing rings and channels, this must not be understood as involving a limitation regarding the shape of the tank. In the known way, the tank may very well be square-shaped with rounded corners or polygonal in a horizontal plane perpendicular to the drawing.

What I claim is:

1. An apparatus for indicating leakage through a seam extending around the wall of a vessel of the type having at least one opening remote from said seam, said apparatus comprising:

a receptacle formed by two rigid dismountable parts cooperating to form a recess dimensioned to receive therein, with a slight clearance only, a vessel to be tested;

two sealing rings mounted on inner portions of respective of said receptacle parts and forming means, when a vessel to be tested is positioned in said recess, for sealingly engaging against such vessel at positions closely adjacent to and on opposite sides of the seam thereof;

said two sealing rings and adjacent inner portions of respective of said receptacle parts, when said two sealing rings are sealingly engaged against a vessel to be tested, delimiting a narrow annular space around the seam of such vessel;

there being, when a vessel to be tested is positioned within said recess and engaged by said two sealing rings, separate chambers defined by inner faces of respective of said receptacle parts and opposed walls of said vessel, at least one of said chambers being in communication with the interior of said vessel through the at least one opening therein;

a first channel means extending from said narrow annular space through one of said receptacle parts for connecting said narrow annular space to a pressure measuring device; and plural additional channel means extending from said separate chambers through both of said receptacle parts for connecting said separate chambers and the interior of said vessel to a source of pressurized fluid.

2. An apparatus as claimed in claim 1, wherein said inner faces of said receptacle parts are rigid faces.

3. An apparatus as claimed in claim 1, wherein said two receptacle parts are bowl-shaped elements each having a flat end surface, said end surfaces being in engagement; and further comprising a third sealing ring positioned between said end surfaces; and an annular channel formed by a groove in at least one of said end surfaces, said annular channel surrounding said third sealing ring and being connected to at least a portion of said plural additional channel means, whereby the sealing effect of said third sealing ring is continually monitored.

* * * * *